(No Model.)
T. J. SMITH.
FENCE MACHINE.
No. 378,378. Patented Feb. 21. 1888.
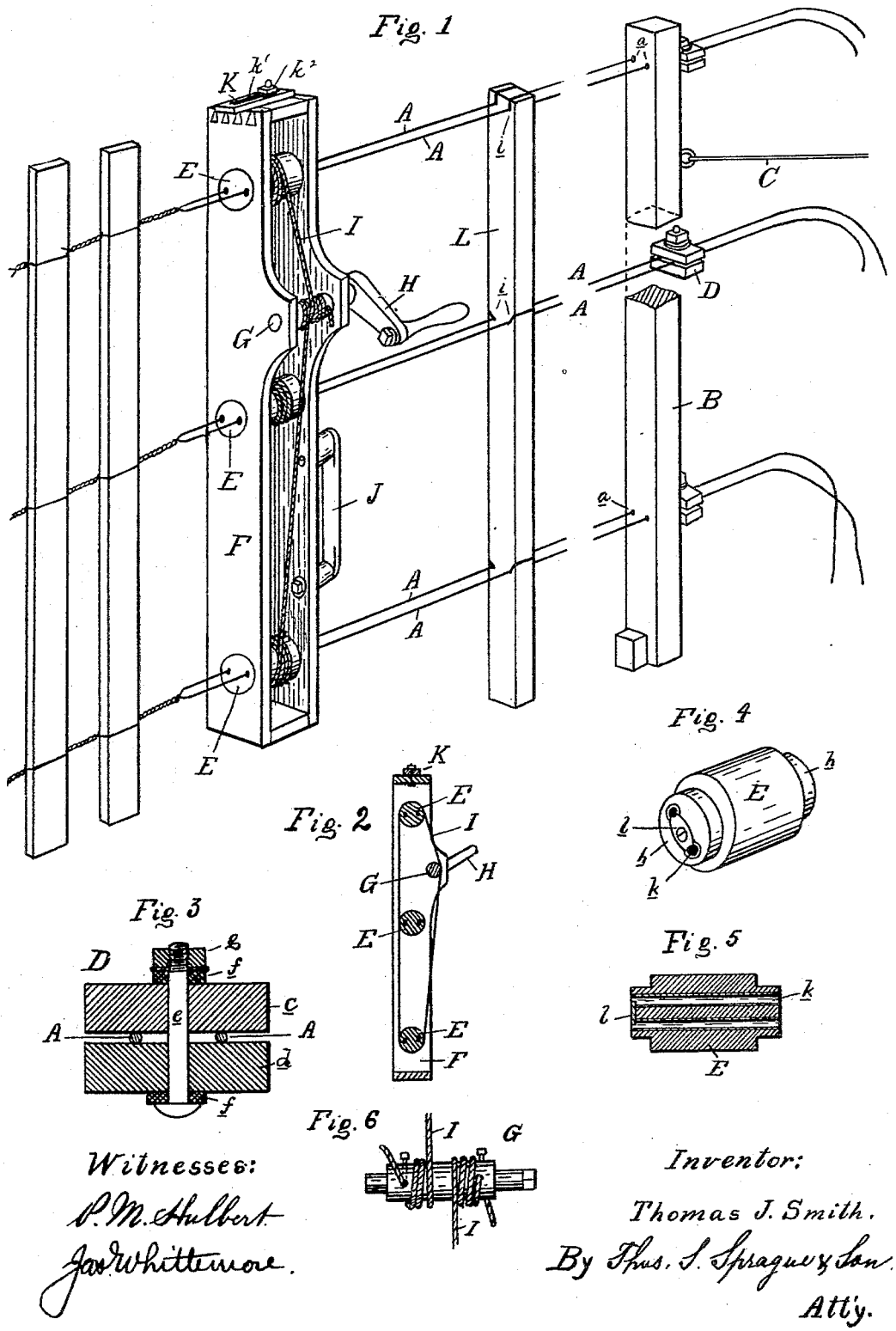
Witnesses:
P. M. Hulbert
Jas. Whittemore.
Inventor:
Thomas J. Smith.
By Thos. S. Sprague & Son.
Att'y.

United States Patent Office.

THOMAS J. SMITH, OF JACKSON, MICHIGAN, ASSIGNOR OF ONE-HALF TO GEORGE MERRILL, OF SAME PLACE.

FENCE-MACHINE.

SPECIFICATION forming part of Letters Patent No. 378,378, dated February 21, 1888.

Application filed October 1, 1887. Serial No. 251,160. (No model.)

*To all whom it may concern:*

Be it known that I, THOMAS J. SMITH, a citizen of the United States, residing at Jackson, in the county of Jackson and State of Michigan, have invented certain new and useful Improvements in Fence-Machines, of which the following is a specification, reference being had therein to the accompanying drawings.

This invention relates to new and useful improvements in fence-machines; and the invention consists in the peculiar construction of the parts and their combination and arrangement, all as more fully hereinafter described and set forth.

In the drawings which accompany this specification, Figure 1 is a perspective view showing my machine in operation upon a wire and slat or picket fence. Fig. 2 is a vertical central section on a smaller scale. Fig. 3 is a vertical section of the tension-clamp. Fig. 4 is a detached perspective view of one of the twisters. Fig. 5 is a longitudinal central section of the twister shown in Fig. 4, and Fig. 6 is a detached elevation of the crank-shaft.

A A show three pairs of fence-wires, which on one end (not shown) are secured in the usual manner to a post, and on the opposite end, toward which the operation of the machine proceeds, are passed through holes $a$ in the tension-post B, which on the lower end is firmly secured to the ground and near the upper end is held in position by anchors—such as C—and the wires are kept at the required tension by means of tension-clamps D, one for each pair of fence-wires. One of these tension-clamps is shown in section in Fig. 3, and consists of two plates, $c\ d$, held together by the clamping-bolt $e$, which is provided with one or more elastic washers, $f$, and a nut for tightening, all so arranged that by tightening the nut $g$ each pair of wires A A is firmly clamped between the plates $c\ d$ with any desired tension, which permits the wires to draw through the clamps without losing their tension.

The fence-machine consists of the rotary twisters E—one for each set of wires—and each of these twisters is provided upon opposite ends with bearings $h$, by means of which the twisters are journaled in the frame F of the machine. The frame F is of shorter length than usually provided in this class of machines, as I do not intend to support it upon the ground, but support it upon the fence-wires, as I am enabled by its peculiar operation to dispense with the supporting of the frame in this way, as hereinafter will more fully appear.

G is a crank-shaft journaled in the upper portion of the frame parallel to the twisters, and this crank-shaft is provided upon its outer end with a suitable crank, H, for turning it by hand.

I is a rope, the ends of which are adjustably secured to the crank-shaft G in any suitable manner—such as shown, for instance, in Fig. 6, where the ends of the rope are passed through holes in the shaft and are held therein from slipping out by set-screws. This rope is wound around all the twisters in the same direction, so as to convey like motion to all of them; but the ends before being fastened to the crank-shaft pass around the same in opposite directions, there being a sufficient number of coils formed upon the twisters and the crankshaft to permit a sufficient number of rotations in one direction or another to be given to the twisters to form the necessary twist in the wires between the pickets or slats.

J is a handle by means of which the device may be conveniently drawn along the wires. K is a gage adjustably secured on the top of the machine, by means of the slot K' and setscrew K², to form a gage for the top of the pickets, and L is a movable support provided with suitable notches, $i$, through which the wires pass; and the object of this support is to hold the wires at the necessary height above the ground against the action of the weight of the machine, which necessarily would otherwise draw them out of line.

The twisters E are provided with the usual wire-passages, $k$, which are preferably formed by means of metallic tubes secured in the twisters, and these tubes are of sufficient size in cross-section to permit splices in the wire to pass through, and also of adjusting the wires closer together or farther apart by means of the spreader-bars $l$, which are secured near the mouth of the tubes and are exchangeable, so that shorter or longer spreader-bars may be used, according to the desired distance apart of the wires, for thicker or thinner slats.

In practice the fence-wires A A are first secured in position for a whole length of fence in the usual manner, one end of said fence-wire being secured to a fixed post, and, with the wires passing through the twisting-spools E, the other end is secured to the tension-post. After the wires are stretched and the clamps D sufficiently tightened to prevent the wires from becoming slack, the work of twisting in the slats or pickets is proceeded with in the usual manner; but the operation of the machine is different in many respects from the machines in present use.

For the convenience of the operator the crank H is journaled more or less to one side of the central line.

By attaching the ends of the rope I adjustably to the crank-shaft G, or to one of the twisters, means are furnished to tighten the rope, and also to increase or decrease the number of coils of the rope on the shaft G, in order to lengthen or shorten the distance between the pickets in weaving.

To regulate the distance between the two wires of each set, the spreader-bars $l$ are removably secured to the ends of the twisters, so as to permit of their being readily exchanged.

In using the guide-post L, which supports the wires from the ground in close proximity to the machine, the wires are kept in position against the action of the weight of the machine.

What I claim as my invention is—

1. In a wire-fence machine, the combination of the frame F, the twisters E, journaled therein, the actuating crank-shaft G, and the rope I, arranged to form a series of coils around said crank-shaft and twisters and having its ends secured to said crank-shaft, substantially as described.

2. In a wire-fence machine, the twisters E, provided with the enlarged wire-passages $k$, and the spreader-bars $l$, removably secured upon the ends of the twisters between the wire-passages, substantially as described.

3. The wire-fence machine described, consisting of the frame F, the twisters E, journaled in said frame, the crank-shaft G, journaled in said frame parallel with the twisters to one side of the central line, the crank H, the rope I, wound around all of said twisters and arranged to impart a limited rotary motion to the twisters and having its ends adjustably secured to the crank-shaft G, the handle J, and the slat-guide K, all arranged substantially as described.

In testimony whereof I affix my signature, in presence of two witnesses, this 5th day of September, 1887.

THOMAS J. SMITH.

Witnesses:
JAS. WHITTEMORE,
P. M. HULBERT.